United States Patent
Seo (10) Patent No.: US 10,891,047 B2
(45) Date of Patent: Jan. 12, 2021

(54) METHOD AND APPARATUS FOR UNLOCKING TERMINAL

(71) Applicant: Jin Young Seo, Seoul (KR)

(72) Inventor: Jin Young Seo, Seoul (KR)

(73) Assignee: LG CNS CO., LTD., Seoul (KR)

( * ) Notice: Subject to any disclaimer, the term of this patent is extended or adjusted under 35 U.S.C. 154(b) by 608 days.

(21) Appl. No.: 14/290,716

(22) Filed: May 29, 2014

(65) Prior Publication Data

US 2014/0365903 A1    Dec. 11, 2014

(30) Foreign Application Priority Data

Jun. 7, 2013  (KR) .......................... 10-2013-0065358

(51) Int. Cl.
    *G06F 3/0488* (2013.01)
(52) U.S. Cl.
    CPC ................. *G06F 3/04883* (2013.01)
(58) Field of Classification Search
    CPC .... G06F 3/04842; G06F 3/0488; G06F 3/017; G06F 17/30424; G06F 3/04847; G06F 2203/04104; G06F 3/0416; G06F 3/04817; G06F 3/0482; G06F 21/36; G06F 3/04886; G06F 3/0481; G06F 3/048; G06F 2203/04808; G06F 21/316; G06F 21/629; G06F 3/04812; G06F 21/31; G06F 3/0484; G06F 2203/04803; G06F 3/0486; G06F 3/1454; G06F 3/04845; G06F 2221/032; G06F 21/74; G06F 3/044; G06F 3/04883; G06F 3/04892; H04M 2250/22; H04M 1/72547; H04M 1/72583; H04M 1/67;

(Continued)

(56) References Cited

U.S. PATENT DOCUMENTS

| | | | | |
|---|---|---|---|---|
| 7,231,231 B2 * | 6/2007 | Kokko | ............... | G06F 3/0488 345/104 |
| 7,593,000 B1 * | 9/2009 | Chin | ............... | G06F 3/04883 345/156 |
| 8,402,533 B2 * | 3/2013 | LeBeau | ............... | G06F 21/36 726/17 |
| 8,504,842 B1 * | 8/2013 | Meacham | ............ | G06F 3/0488 713/183 |

(Continued)

OTHER PUBLICATIONS

K. I. Shin, J. S. Park, J. Y. Lee and J. H. Park, "Design and Implementation of Improved Authentication System for Android Smartphone Users," 2012 26th International Conference on Advanced Information Networking and Applications Workshops, Fukuoka, 2012, pp. 704-707, doi: 10.1109/WAINA.2012.31. (Year: 2012).*

(Continued)

*Primary Examiner* — Renee D Chavez
*Assistant Examiner* — Carl P Lobo
(74) *Attorney, Agent, or Firm* — KED & Associates LLP (57) ABSTRACT

Provided are a method and a terminal for unlocking a locked mode of the terminal. The terminal may include a display to display a home screen in an unlocked mode and a lock screen in a locked mode, an appearance of the lock screen being the same as a home screen, a user interface to receive inputs to unlock the lock screen, and a controller configured to unlock the lock screen based on the received inputs. The input may be received when the lock screen is displayed on the display in the lock mode, the input having a prescribed pattern. When the prescribed pattern of the input corresponds to a previously stored unlocking pattern, the lock screen may be unlocked to display the home screen.

13 Claims, 9 Drawing Sheets

(58) Field of Classification Search
CPC ........... H04M 1/0266; H04M 1/72522; H04W 12/06; H04N 1/00408
See application file for complete search history.

(56) References Cited

U.S. PATENT DOCUMENTS

| | | | | |
|---|---|---|---|---|
| 8,589,374 | B2* | 11/2013 | Chaudhri | G06F 3/04817 707/706 |
| 8,630,623 | B2* | 1/2014 | Park | G06F 3/0488 345/173 |
| 8,776,095 | B2* | 7/2014 | Huang | G06F 21/6209 715/741 |
| 9,032,337 | B2* | 5/2015 | Oh | G06F 3/04883 715/863 |
| 9,147,058 | B2* | 9/2015 | Casey | G06F 3/04895 |
| 9,326,147 | B2* | 4/2016 | Nakazawa | G06F 3/0483 |
| 9,372,970 | B2* | 6/2016 | Casey | G06F 21/31 |
| 9,459,698 | B2* | 10/2016 | Lee | G06F 3/017 |
| 9,563,350 | B2* | 2/2017 | Kim | G06F 3/04883 |
| 9,619,037 | B2* | 4/2017 | St. Clair | G06F 3/017 |
| 10,198,568 | B2* | 2/2019 | Hwang | G06F 3/0488 |
| 2005/0253817 | A1* | 11/2005 | Rytivaara | G06F 3/04883 345/173 |
| 2008/0122796 | A1* | 5/2008 | Jobs | G06F 3/0488 345/173 |
| 2009/0006991 | A1* | 1/2009 | Lindberg | G06F 3/04817 715/763 |
| 2009/0167717 | A1* | 7/2009 | Wang | G06F 3/0416 345/173 |
| 2009/0265666 | A1* | 10/2009 | Hsieh | G06F 3/0481 715/835 |
| 2009/0289916 | A1* | 11/2009 | Dai | G06F 3/04883 345/173 |
| 2010/0001967 | A1* | 1/2010 | Yoo | G06F 3/0488 345/173 |
| 2010/0257490 | A1* | 10/2010 | Lyon | G06F 3/0488 715/863 |
| 2010/0293508 | A1* | 11/2010 | Hwang | G06F 3/04886 715/846 |
| 2010/0306693 | A1* | 12/2010 | Brinda | G06F 3/0488 715/784 |
| 2010/0306718 | A1* | 12/2010 | Shim | G06F 3/04883 715/863 |
| 2011/0041102 | A1* | 2/2011 | Kim | G06F 3/04883 715/863 |
| 2011/0088086 | A1* | 4/2011 | Swink | G06F 3/04883 726/7 |
| 2011/0105193 | A1* | 5/2011 | Lee | G06F 3/0488 455/566 |
| 2011/0271181 | A1* | 11/2011 | Tsai | G06F 3/04883 715/702 |
| 2011/0283241 | A1* | 11/2011 | Miller | G06F 3/04883 715/863 |
| 2011/0294467 | A1* | 12/2011 | Kim | G06F 1/1643 455/411 |
| 2011/0300831 | A1* | 12/2011 | Chin | G06F 1/3203 455/411 |
| 2012/0084734 | A1* | 4/2012 | Wilairat | G06F 21/36 715/863 |
| 2012/0129496 | A1* | 5/2012 | Park | G06F 3/0488 455/411 |
| 2012/0133484 | A1* | 5/2012 | Griffin | H04M 1/67 340/5.54 |
| 2012/0174042 | A1* | 7/2012 | Chang | G06F 3/04883 715/863 |
| 2012/0184247 | A1* | 7/2012 | Choe | H04M 1/67 455/411 |
| 2012/0220264 | A1* | 8/2012 | Kawabata | G06F 3/04883 455/411 |
| 2012/0284297 | A1* | 11/2012 | Aguera-Arcas | G06F 21/629 707/769 |
| 2012/0284673 | A1* | 11/2012 | Lamb | G06F 3/04883 715/863 |
| 2013/0055169 | A1* | 2/2013 | Wright | H04M 1/67 715/863 |
| 2013/0069893 | A1* | 3/2013 | Brinda | G06F 3/0488 345/173 |
| 2013/0069989 | A1* | 3/2013 | Nagata | G09G 3/20 345/659 |
| 2013/0080759 | A1* | 3/2013 | Reeves | G06F 3/1438 713/100 |
| 2013/0080964 | A1* | 3/2013 | Shigeta | G06F 3/0488 715/773 |
| 2013/0082945 | A1* | 4/2013 | Jo | H04M 1/67 345/173 |
| 2013/0086522 | A1* | 4/2013 | Shimazu | G06F 3/0488 715/810 |
| 2013/0088442 | A1* | 4/2013 | Lee | H04M 1/67 345/173 |
| 2013/0093707 | A1* | 4/2013 | Park | G06F 21/31 345/173 |
| 2013/0094770 | A1* | 4/2013 | Lee | G06F 21/36 382/218 |
| 2013/0102281 | A1* | 4/2013 | Kanda | G06F 21/36 455/410 |
| 2013/0103723 | A1* | 4/2013 | Hori | G06F 17/30997 707/803 |
| 2013/0111379 | A1* | 5/2013 | Hong | G06F 3/0488 715/764 |
| 2013/0113723 | A1* | 5/2013 | Chen | G06F 21/30 345/173 |
| 2013/0117698 | A1* | 5/2013 | Park | G06F 3/04817 715/765 |
| 2013/0139226 | A1* | 5/2013 | Welsch | G06F 21/30 726/4 |
| 2013/0191786 | A1* | 7/2013 | Kuo | G06F 21/36 715/846 |
| 2013/0229367 | A1* | 9/2013 | Pinch | G06F 3/041 345/173 |
| 2014/0006285 | A1* | 1/2014 | Chi | G06Q 20/3223 705/44 |
| 2014/0006965 | A1* | 1/2014 | Xu | G06F 3/048 715/741 |
| 2014/0009421 | A1* | 1/2014 | Lee | G06F 3/041 345/173 |
| 2014/0059674 | A1* | 2/2014 | Sun | G06F 21/31 726/19 |
| 2014/0099924 | A1* | 4/2014 | Kim | H04W 12/06 455/411 |
| 2014/0109024 | A1* | 4/2014 | Miyazaki | G06F 3/0482 715/863 |
| 2014/0137049 | A1* | 5/2014 | Jung | G06F 21/316 715/847 |
| 2014/0143856 | A1* | 5/2014 | Wu | H04W 12/0605 726/16 |
| 2014/0145821 | A1* | 5/2014 | Wang | G07C 9/33 340/5.54 |
| 2014/0245432 | A1* | 8/2014 | Zhou | G06F 3/04883 726/19 |
| 2014/0283142 | A1* | 9/2014 | Shepherd | H04M 1/673 726/30 |
| 2014/0317499 | A1* | 10/2014 | Oh | G06F 3/0304 715/702 |
| 2014/0365904 | A1* | 12/2014 | Kim | G06F 3/0484 715/741 |
| 2015/0229754 | A1* | 8/2015 | Won | G06F 3/04886 455/575.8 |
| 2016/0196419 | A1* | 7/2016 | Kuscher | H04M 1/72577 715/741 |
| 2016/0302068 | A1* | 10/2016 | Choi | H04W 12/08 |

OTHER PUBLICATIONS

B. A. P. Botelho, E. T. Nakamura and N. Uto, "Implementation of tools for brute forcing touch inputted passwords," 2012 International Conference for Internet Technology and Secured Transactions, London, 2012, pp. 807-808. (Year: 2012).*

(56) References Cited

OTHER PUBLICATIONS

Disclosed anonymously, "Method for unlock touch screen device", IP.com Prior Art Database Technical Disclosure, May 10, 2013, pp. 1-6 (Year: 2013).*

Disclosed Anonymously, "System and method of unlocking a mobile device with multiple touches", IP.com Prior Art Database Technical Disclosure, Jul. 26, 2012, pp. 1-8 (Year: 2012).*

* cited by examiner

METHOD AND APPARATUS FOR UNLOCKING TERMINAL

CROSS-REFERENCE TO RELATED APPLICATION

This application claims the priority benefit of Korean Patent Application No. 10-2013-0065358, filed on Jun. 7, 2013, in the Korean Intellectual Property Office, the disclosure of which is incorporated herein by reference.

BACKGROUND

1. Field

The present disclosure relates to a method and apparatus for unlocking a terminal in a lock mode, and more particularly, to technology for unlocking the terminal through a user input of an unlocking pattern.

2. Background

Methods and apparatuses for unlocking a terminal in a lock mode are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to exemplary embodiments of the present disclosure, examples of which are illustrated in the accompanying drawings, wherein like reference numerals refer to the like elements throughout. Exemplary embodiments are described below to explain the present disclosure by referring to the figures.

An aspect of the present disclosure provides a method, an apparatus, and a system for providing a lock screen changed based on a change in a home screen.

Another aspect of the present disclosure also provides a method, an apparatus, and a system for adaptively using a starting point, an ending point, and a moving path in a process of setting an unlocking pattern in a terminal, based on a user input.

Still another aspect of the present disclosure also provides a method, an apparatus, and a system for using at least one icon included in a lock screen in a process of setting a starting point of an unlocking pattern.

Yet another aspect of the present disclosure also provides a method, an apparatus, and a system for providing a high level of security by obtaining a relatively large number of cases of unlocking a locked mode through multiplying a number of cases of unlocking pattern and a number of cases of an icon, corresponding to a starting point of the unlocking pattern.

Figure 1A:
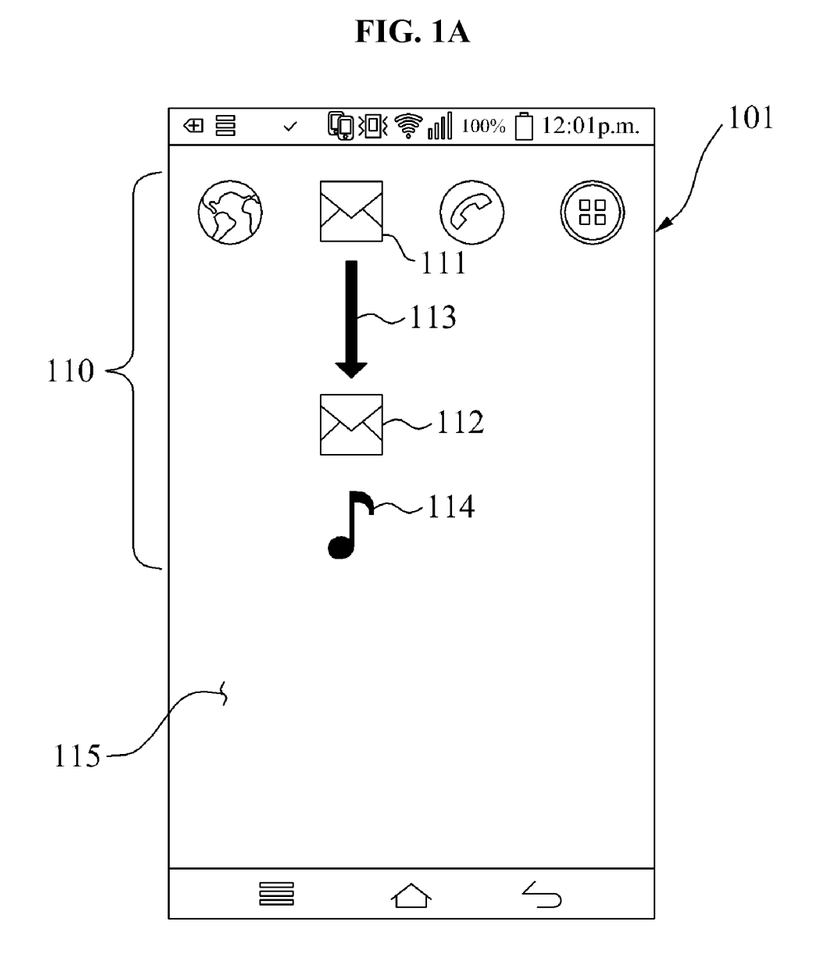
FIGS. 1A and 1B are diagrams illustrating a home screen and a lock screen according to an embodiment of the present disclosure.
Figure 1B:
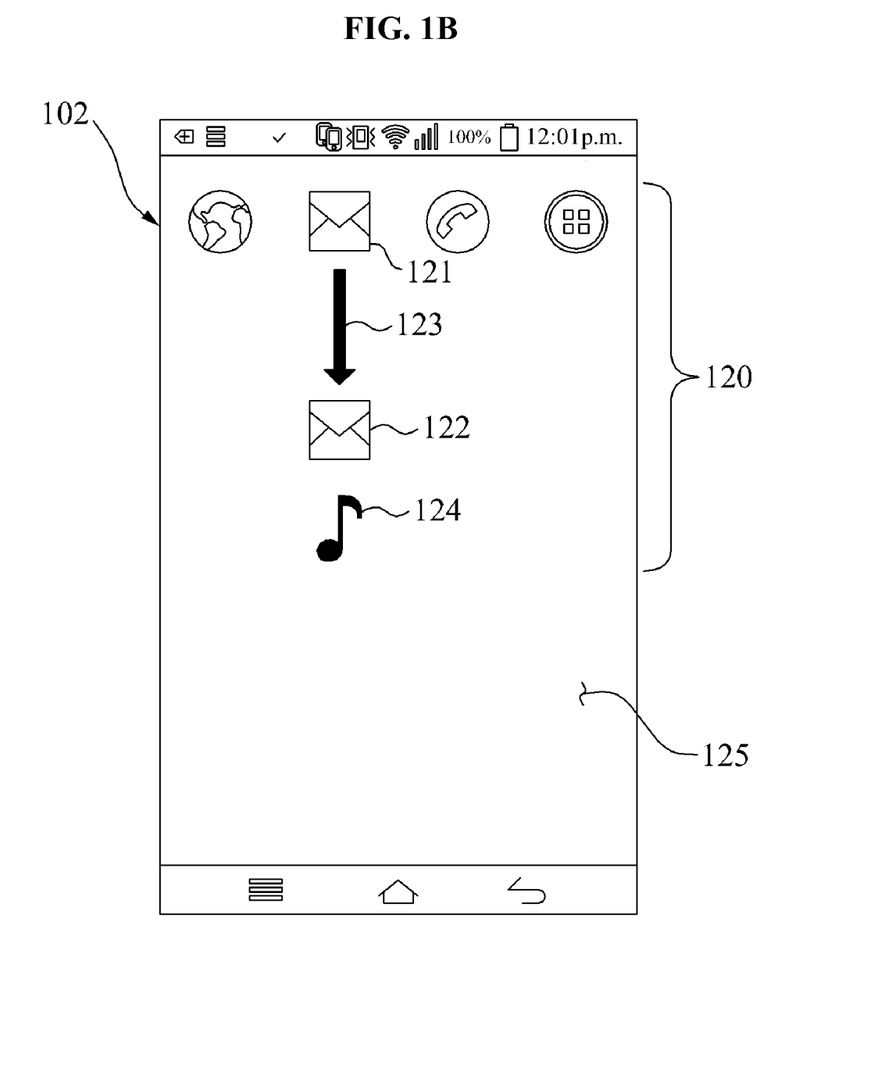

FIG. 1A is a diagram illustrating a home screen and FIG. 1B is a diagram illustrating a lock screen according to an embodiment of the present disclosure. The screens shown in FIGS. 1A and 1B may be screens for a mobile terminal such as a mobile phone, PDA, tablet, or the like, but may also include screens for other types of terminals such as laptops, computers, monitors, or the like.

The home screen may be displayed when the terminal is unlocked and the lock screen may be displayed when the terminal is locked. The locked screen may disable access to various features of the terminal, however, may allow limited access to certain features. For example, the lock screen may display notifications, display previews of new message, display icons which are displayed in the home screen while not being accessible, or the like.

A lock screen 102 of FIG. 1B may correspond to a home screen 101 of FIG. 1A, displayed in a terminal unlocked from a locked mode. Here, the home screen 101 may include at least one icon corresponding to at least one icon displayed in the lock screen 102. In this instance, a correlation between the home screen 101 and the lock screen 102 may indicate that the lock screen 102 displays an identical background image when compared to the home screen 101, and the at least one icon of the lock screen has an identical icon image or an identical icon arrangement when compared to the at least one icon of the home screen. For example, a background image 125 of the lock screen 102 may be identical to a background image 115 of the home screen 101. Also, a plurality of icons 120 included in the lock screen 102 may be identical to a plurality of icons 110 included in the home screen 101. Here, the arrangement as well as content, of the icons 110 and 120 may be the same in both screens.

The lock screen 102 may be changed based on a change in the home screen 101. For example, when a message icon of the home screen 101 is moved from a first position 111 to a second position 112 as indicated by an arrow 113, a message icon of the lock screen 102 may correspondingly be moved from a first position 121 to a second position 122 as indicated by an arrow 123.

A process of unlocking a locked mode of a terminal according to an embodiment of the present disclosure may be performed by inputting an unlocking pattern on the lock screen and comparing the input unlocking pattern to a preset unlocking pattern. For example, when a user inputs, as a starting point, a music icon 124 of the lock screen 102 corresponding to a music icon 114 of the home screen 101, the process of unlocking a locked mode of the terminal may be performed by comparing a result of the inputting to the music icon 124 preset as a starting point of an unlocking pattern. Hereinafter, descriptions about the process of unlocking a locked mode of a terminal will be provided.

Figure 2:
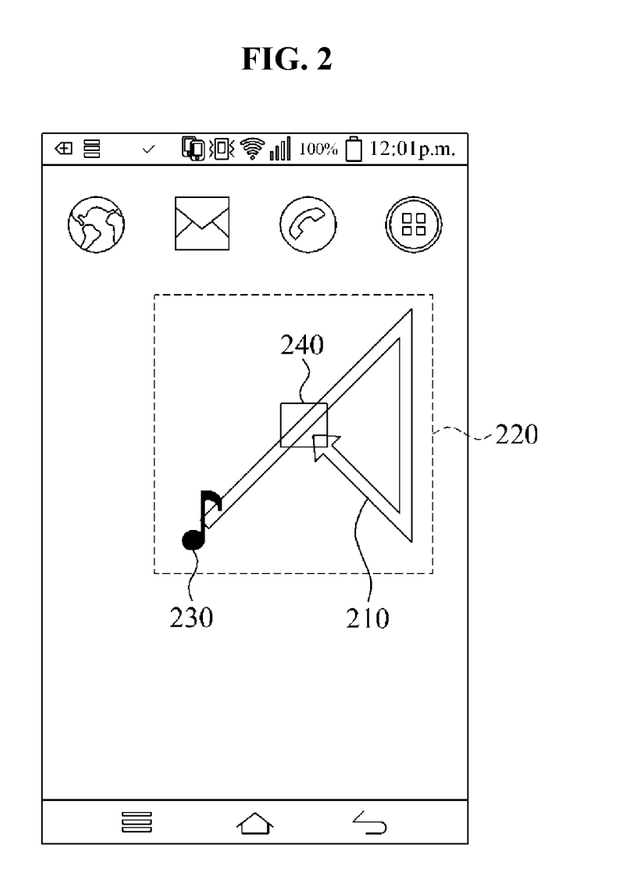
FIG. 2 is a diagram illustrating a preset unlocking pattern according to an embodiment of the present disclosure.

FIG. 2 is a diagram illustrating a preset unlocking pattern according to an embodiment of the present disclosure. An unlocking pattern 210 may be used as a comparative reference for unlocking a locked mode of a terminal by storing and setting, on a lock screen, a starting point, an ending point, and a moving path input by a user in advance.

A device for unlocking a locked mode of a terminal may preset the starting point and the ending point of the unlocking pattern 210 on the lock screen. Here, the starting point and the ending point of the unlocking pattern 210 may be previously stored and set based on a result of a user selecting at least one icon of the lock screen being displayed. In this instance, an icon corresponding to the starting point may be identical to or differ from an icon corresponding to the ending point in the unlocking pattern 210. For example, when the lock screen includes a browser icon, a mail icon, a calling icon, a settings icon, a music icon 230, and a book icon 240, the user may select the music icon 230 from the displayed icons to associate or assign the music icon 230 to the starting point of the unlocking pattern 210. Also, the book icon 240 may be selected from among the remaining icons, aside from the music icon 230 corresponding to the starting point, to be the ending point of the unlocking pattern 210.

Moreover, in one embodiment, the same icon (e.g., the music icon 230 in the example above) may be associated to both the starting point and the ending point of the unlocking pattern. In this case, in order to unlock the lock screen, the input will begin at the music icon 230, traverse across the screen according to the moving pattern, and return to the music icon 230.

In certain embodiments, the controller may be configured to automatically adjust the unlocking pattern. For example, when an icon associated with a starting point is moved, the controller may adjust the moving path to correspond to the new positions of the icons while maintaining a similar shape of the path. Alternatively, the unlocking pattern may be reset or a notification may be displayed to alert the user when an icon is moved, for example, when the icons associated with the unlocking pattern are moved such that the moving path cannot retain a similar shape.

When an icon is not included in the lock screen, the starting point and the ending point of the unlocking pattern 210 may be set using a coordinate value on the lock screen. For example, the device for unlocking a locked mode of a terminal may set a value based on a predetermined pixel unit, starting from a lower left portion of the lock screen. Through this, the device may receive an input corresponding to the starting point of the unlocking pattern 210 using a predetermined coordinate value, and receive an input corresponding to the ending point of the unlocking pattern 210 using a predetermined coordinate value from a user.

Also, the device for unlocking a locked mode of a terminal may preset the moving path of the unlocking pattern 210 on the lock screen. The moving path of the unlocking pattern 210 may be set by setting a lattice 220 having a preset range from the starting point, and extracting the moving path included in the lattice 220 based on the starting point. An ending point of the moving path included in the lattice 220 may be the ending point of the unlocking pattern 210. For example, the moving path may be set by setting the lattice based on the music icon 230 corresponding to the starting point, and extracting the moving path using a movement of a touch gesture terminated at the book icon 240 corresponding to the ending point in the lattice based on the music icon 230 corresponding to the starting point. In this example, the unlocking pattern 210 may be input and stored through a user interface of the terminal based on at least one of a single touch gesture, a multi-touch gesture indicating a touch of at least one finger of the user, a predetermined movement of the touch gesture, or an air flow caused by the user. For example, the terminal may include a device for sensing air flow so as to recognize the air flow caused by the user and set a moving path based on a result of the sensing.

The aforementioned process of presetting the unlocking pattern 210 may be performed on the lock screen and a prescribed screen that includes a grid of points on the screen (also referred to as a point screen).

Figure 3:
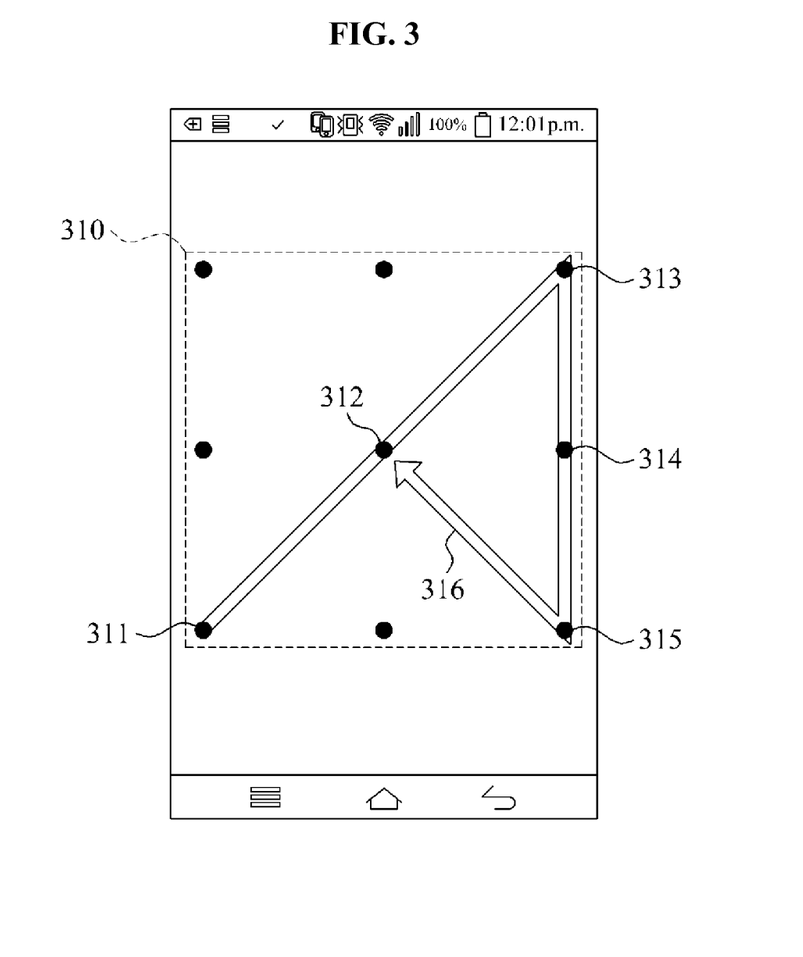
FIG. 3 is a diagram illustrating a preset unlocking pattern of a point screen according to an embodiment of the present disclosure.

FIG. 3 is a diagram illustrating an unlocking pattern preset on a point screen 310 according to an embodiment of the present disclosure. The unlocking pattern according to an embodiment of the present disclosure may be used as a comparative reference for unlocking a locked mode of a terminal by storing and setting each of a starting point, an ending point, and a moving path 316 on the point screen 310 through a user input in advance. For example, a device for unlocking a locked mode of the terminal may input a first point 311 corresponding to the starting point and a second point 312 corresponding to the ending point, to set the starting point and the ending point on the point screen including a total of nine points in a "3 by 3" arrangement, thereby setting the starting point and the ending point. Also, the moving path 316 may be input and stored based on a movement of a touch gesture passing through the first point 311, the second point 312, a third point 313, a fourth point 314, and a fifth point 315.

As an example, the unlocking pattern may be input and stored based on a touch gesture performed at a plurality of points during a predetermined period of time. Also, the unlocking pattern may be input and stored based on a multi-tough gesture using at least one finger of a user, as well as a single touch gesture. In this example, a number and positions of the plurality of points included in the point screen may be set arbitrarily. Moreover, the plurality of points may be displayed on the display screen or hidden from view based on user preferences.

Figure 4A:
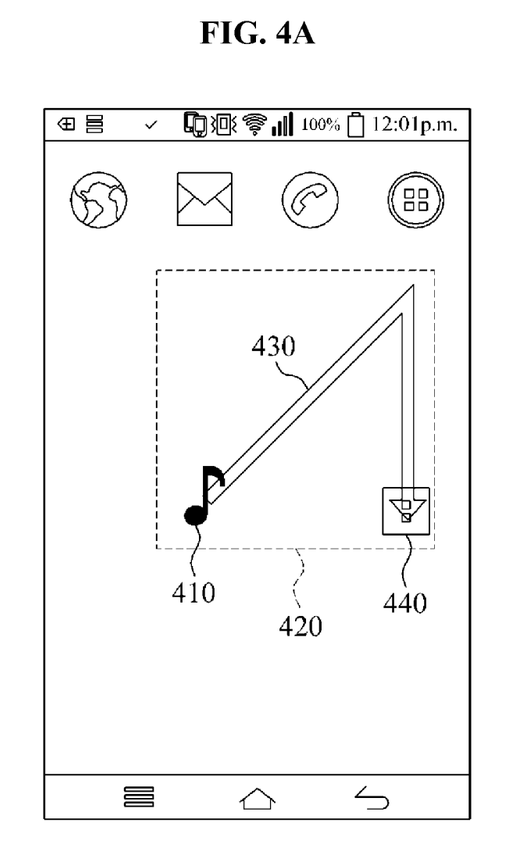
FIGS. 4A and 4B are diagrams illustrating a process of unlocking a locked mode of a terminal according to an embodiment of the present disclosure.
Figure 4B:
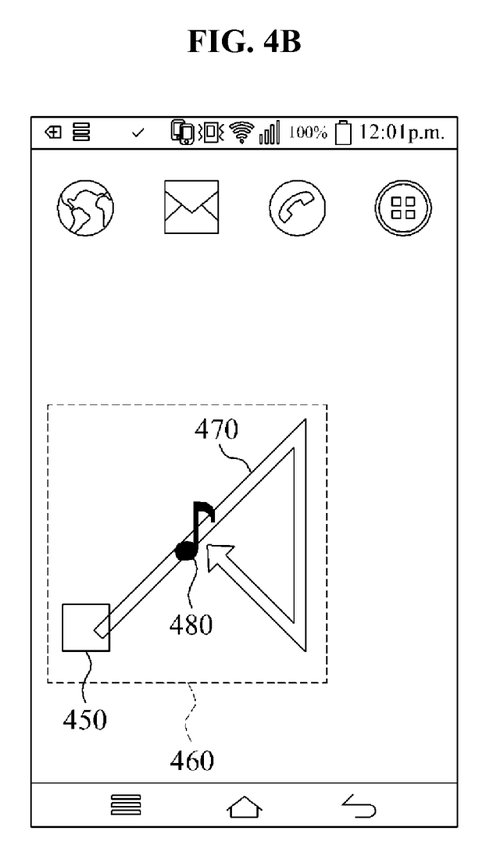

FIGS. 4A and 4B are diagrams illustrating a process of unlocking a locked mode of a terminal according to an embodiment of the present disclosure. When a starting point, an ending point, and a moving path of an unlocking pattern according to an embodiment of the present disclosure is input by a user, and then the input unlocking pattern is stored and set, a device for unlocking a locked mode may compare the input unlocking pattern to a preset unlocking pattern. When the input unlocking pattern is identical to the preset unlocking pattern, the terminal may be unlocked from the locked mode. In this example, a process of inputting the unlocking pattern on the lock screen by the user may be identically performed when compared to a process of presetting the unlocking pattern of the terminal by the user. For example, the process of the user inputting the unlocking pattern on the lock screen may be performed by inputting the starting point and the ending point on the lock screen, setting a lattice having a preset range from the starting point, and inputting the moving path in the lattice based on the starting point.

In this example, the comparing of the input unlocking pattern to the preset unlocking pattern may be performed by comparing the starting point of the input unlocking pattern to the starting point of the preset unlocking pattern, comparing the ending point of the input unlocking pattern to the ending point of the preset unlocking pattern, and comparing the moving path of the input unlocking pattern to the moving path of the preset unlocking pattern.

For example, when the preset unlocking pattern includes a music icon 410 corresponding to the starting point and a flash icon 440 corresponding to the ending point is input and stored to be used for a moving path 430 on a lattice 420, and when the input unlocking pattern includes the music icon 410 corresponding to the starting point, the flash icon 440 corresponding to the ending point, and the moving path 430 corresponding to a predetermined movement of a touch gesture of the user on the lattice 420, the preset unlocking pattern may be identical to the input unlocking pattern and thus, the terminal may be unlocked from the locked mode.

When the unlocking pattern input by a user differs from the preset unlocking pattern, the device for unlocking a locked mode may provide, to the terminal, a notification indicating a result of the comparing. In this example, when a difference is found in at least one result of the comparing the starting point of the input unlocking pattern to the starting point of the preset unlocking pattern, a result of the comparing the ending point of the input unlocking pattern to the ending point of the preset unlocking pattern, and a result of the comparing the moving path of the input unlocking pattern to the moving path of the preset unlocking pattern, a notification indicating an input of an incorrect pattern may be provided to the terminal.

For example, when the preset unlocking pattern includes the music icon 410 corresponding to the starting point, the flash icon 440 corresponding to the ending point input and stored as the moving path 430 on the lattice 420, as illustrated in FIG. 4A, and when the input unlocking pattern includes the book icon 450 corresponding to the starting point, the music icon 480 corresponding to the ending point, and the moving path 470 corresponding to a predetermined movement of a touch gesture of the user on the lattice 460, as illustrated in FIG. 4B, it may be determined that the preset unlocking pattern differs from the input unlocking pattern. Thus, the terminal may not be unlocked from the locked mode, and the notification indicating an incorrect input of the unlocking pattern may be provided to the terminal.

Figure 5:
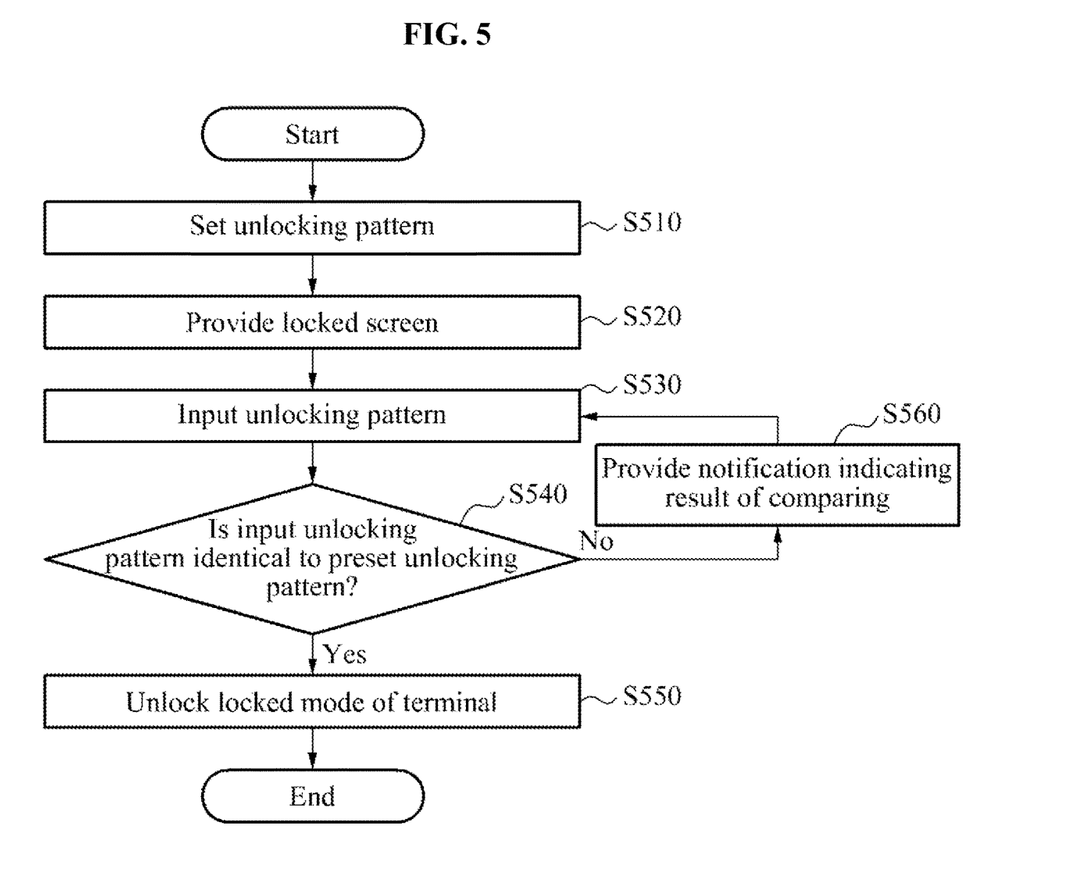
FIG. 5 is a flowchart illustrating a method of unlocking a locked mode of a terminal according to an embodiment of the present disclosure.

In this example, the unlocking pattern may be input through a user interface of the terminal based on at least one of a single touch gesture, a multi-touch gesture indicating a touch of at least one finger of the user, a predetermined movement of the touch gesture, or an air flow caused by the user. For example, the terminal may include a device for recognizing an air flow so as to recognize the air flow caused by the user, and input a moving path based on a result of the recognizing FIG. 5 is a flowchart illustrating a method of unlocking a locked mode of a terminal according to an embodiment of the present disclosure. In the method of unlocking a locked mode of a terminal, an unlocking pattern of a terminal may be set by a user in operation 510. The unlocking pattern may be set in the home screen 101 while in an unlocked state. However, the unlocking pattern may also be set from the lock screen 102, for example, by authenticating the user using a passcode or the like prior to authorizing the user to set the unlocking pattern for future use.

The terminal may provide a lock screen during a locked mode, in step S520. The unlocking pattern input may be input on the lock screen by the user, in step S530.

The unlocking pattern input may be compared to the preset unlocking pattern, in step S540. When the unlocking pattern input is identical to the preset unlocking pattern, the locked mode may be unlocked and a home screen 101 identical to the lock screen 102 may be provided, in step S550. However, when the unlocking pattern input differs from the preset unlocking pattern, a notification indicating a result of the comparing may be provided to the terminal, in step S560.

Figure 6:
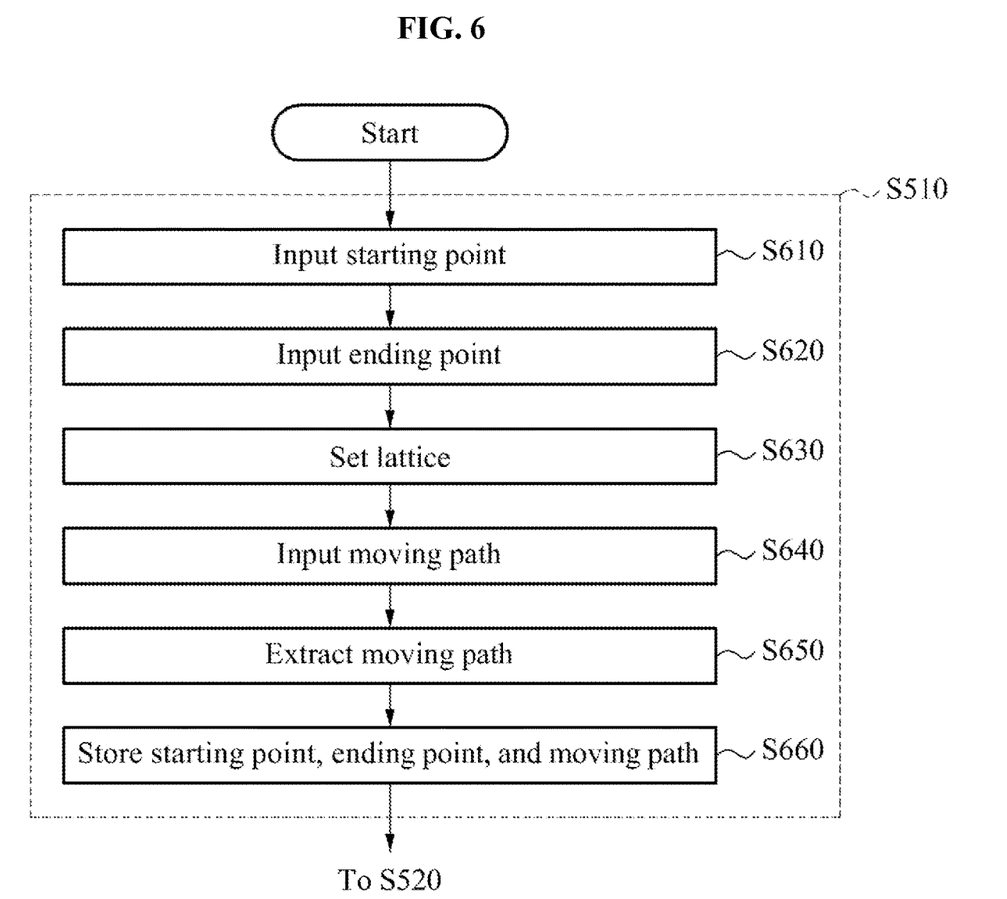
FIG. 6 is a flowchart illustrating an operation of setting an unlocking pattern of FIG. 5.

FIG. 6 is a flowchart illustrating operation 510 of setting an unlocking pattern of FIG. 5. In a method of unlocking a locked mode of a terminal, at least one icon corresponding to a starting point may be input on a lock screen, in step S610. At least one icon corresponding to an ending point may be input on a lock screen, in step S620. Here, the icon for the starting point may be the same as the icon for the ending point, or they may be different icons. That is, the path of input may loop back to the original icon.

A lattice having a preset range from the starting point may be set, in step S630. In step S640, a moving path may be input. The moving path included in the lattice may be extracted based on the starting point, in step S650. The starting point, the ending point, and the moving path may be stored, in step S660.

Figure 7:
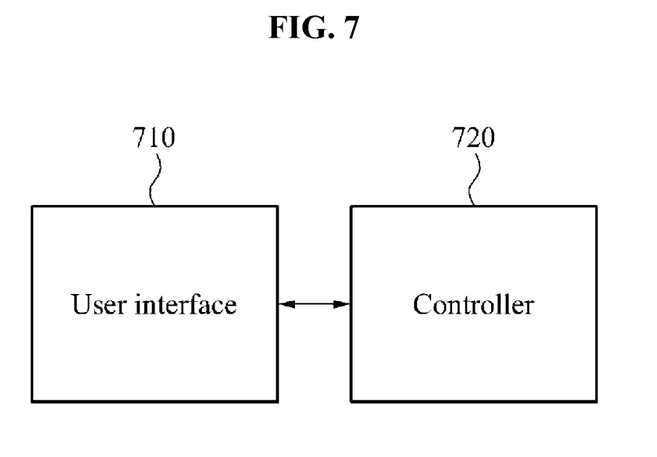
FIG. 7 is a block diagram illustrating a terminal for unlocking a locked mode of the terminal according to an embodiment of the present disclosure.

FIG. 7 is a block diagram illustrating a terminal for unlocking a locked mode of the terminal according to an embodiment of the present disclosure. The terminal for unlocking a locked mode of the terminal according to an embodiment of the present disclosure may include a user interface 710 and a controller 720.

When a user inputs an unlocking pattern on a lock screen during the locked mode to the user interface 710, the locked mode may be unlocked and a home screen identical to the lock screen may be provided. In this instance, the unlocking pattern may include a starting point, an ending point, and a moving path on the lock screen, and at least one icon of the lock screen may be set to be the starting point.

In addition, at least one of a touch gesture of the user, a predetermined movement of the touch gesture, or an air flow caused by the user may be input to the user interface 710. The controller 720 may compare the input unlocking pattern to a preset unlocking pattern to unlock the locked mode. When the input unlocking pattern is identical to the preset unlocking pattern, the controller 720 may unlock the locked mode. When the input unlocking pattern differs from the preset unlocking pattern, the controller 720 may provide, to the terminal, a notification indicating a result of the comparing.

The controller 720 may set the unlocking pattern of the terminal based on a user input. When the starting point, the ending point, and the moving path are input on the home screen or the lock screen, the controller 720 may store the starting point, the ending point, and the moving path.

The controller 720 may display at least one icon corresponding to the starting point on the lock screen. The controller 720 may set a lattice having a preset range from the starting point, and extract the moving path on the lattice based on the starting point. Moreover, the controller 720 may allow the lock screen to be changed based on a change in the home screen.

According to an embodiment of the present disclosure, it is possible to provide a method, an apparatus, and a system for providing a locked screen changed based on a change in a home screen of a terminal unlocked from a locked mode.

According to another embodiment of the present disclosure, it is also possible to provide a method, an apparatus, and a system for adaptively using a starting point, an ending point, and a moving path in a process of setting an unlocking pattern in a terminal based on a user input.

According to still another embodiment of the present disclosure, it is also possible to provide a method, an apparatus, and a system for using at least one icon included in a locked screen in a process of setting a starting point of an unlocking pattern.

According to yet another embodiment of the present disclosure, it is also possible to provide a method, an apparatus, and a system for providing a high level of security by obtaining a relatively large number of cases of unlocking a locked mode through multiplying a number of cases of unlocking pattern and a number of cases of an icon, corresponding to a starting point of the unlocking pattern.

According to another aspect of the present disclosure, a method of unlocking a locked mode of a terminal may include displaying, on a touch screen for receiving inputs, a lock screen in a locked mode, inputting, on the touch screen, a touch input on the lock screen having a prescribed pattern, and displaying a home screen by unlocking the locked mode based on the touch input, wherein an appearance of the home screen is the same as an appearance of the lock screen.

The method may include setting, by a controller, a prescribed unlocking pattern for unlocking the terminal. The setting may include inputting a starting point, an ending point, and a moving path on the touch screen, and storing the starting point, the ending point, and the moving path. Moreover, the setting may include associating at least one icon on the lock screen to the starting point, the ending point or the moving path, the associated icon being positioned on the touch screen corresponding to the starting point, ending point or moving pattern of the unlocking pattern.

The moving path of the prescribed unlocking pattern may extend from the associated icon according to a prescribed pattern of movement to the ending point. The prescribed unlocking pattern may traverse over the at least one icon associated with the starting point, ending point or the moving path.

The setting may include setting a lattice having a prescribed range from the starting point, and extracting the moving path on the lattice based on the starting point. The method may include comparing the input pattern to the set unlocking pattern, and unlocking the terminal when the input pattern corresponds to the set unlocking pattern. Moreover, the method may include comparing the input pattern to the set unlocking pattern, and displaying, on the touch screen, a notification indicating a result of the comparison when the input pattern does not correspond to the set unlocking pattern.

The lock screen may be changed when the home screen is changed such that the appearance of the lock screen and the home screen are the same, wherein at least one icon on the lock screen corresponds to at least one icon on the home screen. The inputting may include inputting, at a user input interface, an input to unlock the terminal including at least one of a touch gesture of the user, a predetermined movement of the touch gesture, or an air flow caused by the user. Moreover, a non-transitory computer-readable medium may be provided that includes a program for instructing a computer to perform the above described method.

According to another aspect of the present disclosure, a terminal may include a display to display a home screen in an unlocked mode and a lock screen in a locked mode, an appearance of the lock screen being the same as a home screen, a user interface to receive inputs to unlock the lock screen, and a controller configured to unlock the lock screen based on the received inputs, wherein the input is received when the lock screen is displayed on the display in the lock mode, the input having a prescribed pattern, and when the prescribed pattern of the input corresponds to a previously stored unlocking pattern, the lock screen is unlocked to display the home screen.

The user interface may include a touch screen and the unlocking pattern is set using the touch screen, the unlocking pattern including a starting point, an ending point, and a moving path between the starting point and the ending point. The unlocking pattern may include at least one icon on the lock screen that is associated with the starting point, the ending point or the moving path. The unlocking pattern may traverse over the at least one icon that is associated with the starting point, the ending point or the moving path. Moreover, the moving path of the unlocking pattern extends from the icon associated with the starting point on the lock screen, along the moving path to the ending point. The controller may set a lattice having a preset range from the starting point, and extracts the moving path on the lattice based on the starting point.

When the appearance of the home screen is changed, the appearance of the lock screen is changed corresponding to the change to the home screen such that the lock screen and the home screen remain the same. Moreover, the input at the user interface includes at least one of a touch gesture on a touch screen, a predetermined movement of a gesture input, or an air flow caused by a user.

According to another aspect of the present disclosure, a method of unlocking a locked mode of a terminal may include providing, by the terminal, a locked screen in the locked mode, inputting, by a user, an unlocking pattern on the locked screen, and providing a home screen identical to the locked screen by unlocking the locked mode.

The method of unlocking a locked mode of a terminal may further include setting, by the user, the unlocking pattern of the terminal. The setting may include inputting a starting point, an ending point, and a moving path on the locked screen, and storing the starting point, the ending point, and the moving path. The setting may include inputting at least one icon corresponding to the starting point on the locked screen. The setting may include setting a lattice having a preset range from the starting point, and extracting the moving path included in the lattice based on the starting point.

The method of unlocking a locked mode of a terminal may further include comparing the input unlocking pattern to the set unlocking pattern, and unlocking the locked mode when the input unlocking pattern is identical to the set unlocking pattern. Moreover, the locked screen may be changed based on a change in the home screen, and the at least one icon of the locked screen may correspond to at least one icon of the home screen.

The method of unlocking a locked mode of a terminal may further include comparing the input unlocking pattern to the set unlocking pattern, and providing, to the terminal, a notification indicating a result of the comparing when the input unlocking pattern differs from the set unlocking pattern. The inputting may include inputting, using a user interface of the terminal, at least one of a touch gesture of the user, a predetermined movement of the touch gesture, and an air flow caused by the user.

According to another aspect of the present disclosure, a terminal may include a user interface to provide a home screen identical to the locked screen when the locked mode is unlocked through a user input of an unlocking pattern on a locked screen in a locked mode, and a controller to compare the input unlocking pattern to a preset unlocking pattern, and unlock the locked mode.

The unlocking pattern may include a starting point, an ending point, and a moving path on the locked screen. The unlocking pattern may include at least one icon corresponding to the starting point on the locked screen. The controller may set a lattice having a preset range from the starting point, and extract the moving path included in the lattice based on the starting point.

The controller may allow the locked screen to be changed based on a change in the home screen. Moreover, at least one of a touch gesture of the user, a predetermined movement of the touch gesture, or an air flow caused by the user may be input to the user interface.

The units described herein may be implemented using hardware components and software components. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents. Thus, other implementations, alternative embodiments and equivalents to the claimed subject matter are construed as being within the appended claims. In addition to variations and modifications in the component parts and/or arrangements, alternative uses will also be apparent to those skilled in the art.

What is claimed is:

1. A method of unlocking a looked mode of a terminal, the method comprising:
setting, by a controller, an unlocking pattern for unlocking the terminal, including
receiving, on a touch screen, a first input to assign a starting point of the unlocking pattern of the touch screen pattern, and receiving, on the touch screen, a second input to assign an ending point of the unlocking pattern of the touch screen,
setting a lattice having a preset range from the starting point of the unlocking pattern, wherein the preset range of the lattice is smaller than the touch screen, and
after receiving the first input on the touch screen and receiving the second input on the touch screen, receiving a first touch-and-drag input to provide a moving path of the unlocking pattern inside the lattice that extends from the starting point to the ending point, wherein the moving path of the unlocking pattern has a prescribed shape that correspond to a continuous touch-and-drag input on the touch screen, and
storing the unlocking pattern including the starting point, the ending point, and the moving path corresponding to the first touch-and-drag input; and
unlocking, by the controller, the terminal, including:
displaying, on the touch screen, a home screen in a locked mode that includes a first icon displayed at the starting point on the home screen, wherein the first icon is assigned to the starting point of the unlocking pattern;
inputting, on the touch screen, a second touch-and-drag input on the home screen to provide a moving path, wherein the moving path of the second touch-and-drag input has a prescribed shape that starts from the first icon at the starting point displayed on the home screen, extends in a first direction to a predetermined point on the home screen, extends in a second direction from the predetermined point on the home screen, and then extends to an ending point, wherein the predetermined point is positioned at a location on the home screen not occupied by an icon or object displayed on the home screen;

in response to the second touch-and-drag input on the home screen, comparing the starting point of the second touch-and-drag input to the starting point of the stored unlocking pattern, comparing the ending point of the second touch-and-drag input to the ending point of the stored unlocking pattern, and comparing the moving path having the prescribed shape of the second touch-and-drag input to the moving path having the prescribed shape of the stored unlocking pattern;

displaying, on the touch screen, a notification indicating a result of the comparison when the starting point, the ending point, and the moving path having prescribed shape of the second touch-and-drag input does not correspond to the set unlocking pattern; and displaying the home screen in an unlocked mode when the starting point, the ending point, and the moving path having the prescribed shape of the second touch-and-drag input corresponds to the starting point, the ending point, and the moving path having the prescribed shape of the moving path of the stored unlocking pattern, wherein an appearance of the home screen is the same in the locked mode as in the unlocked mode.

2. The method of claim 1, wherein the setting includes associating a second icon on the home screen to the ending point, the associated second icon being positioned on the touch screen corresponding to the ending point.

3. The method of claim 2, wherein the moving path of the unlocking pattern extends from the first icon at the starting point to the second icon at the ending point.

4. The method of claim 2, wherein the prescribed shape of the unlocking pattern traverses over the first icon associated with the starting point to the second icon associated with the ending point.

5. The method of claim 1, wherein the home screen in the locked mode is changed when the home screen in the unlocked mode is changed such that the appearance of the home screen in the locked mode and the unlocked mode are the same, and wherein the arrangement of icons on the home screen in the looked mode corresponds to the arrangement of the icons on the home screen in the unlocked mode.

6. A non-transitory computer-readable medium comprising a program for instructing a computer to perform the method of claim 1.

7. A terminal comprising;
a display to display a home screen in an unlocked mode and in a locked mode, the home screen displaying a plurality of icons and an appearance of the home screen being the same in the locked mode as in the unlocked mode;
a user input device; and
a controller configured to set an unlocking pattern and to unlock the home screen when an input received at the user input device matches the unlocking pattern,
wherein the controller is configured to:
receive a first input to assign a starting point of the unlocking pattern on the display, and receive a second input to assign an ending point of the unlocking pattern on the display, wherein a first icon displayed on the home screen is associated with the starting point and a second icon displayed on the home screen is associated with the ending point, set a lattice having a preset range from the starting point of the unlocking pattern, wherein the preset range of the lattice is smaller than the display, after receiving the first input on the display and receiving the second input on the display, receive a first touch-and-drag input to provide a moving path of the unlocking pattern inside the lattice that extends from the starting point to the ending point, wherein the moving path of the unlocking pattern has a prescribed shape that corresponds to a continuous touch-and-drag input on the display between the first icon and the second icon, and store the unlocking pattern including the starting point, the ending point, and the moving path corresponding to the first touch-and-drag input, and wherein a second touch-and-drag input to unlock the terminal is received while the home screen is displayed on the display in the locked mode, the second touch-and-drag input has a moving path that starts from the first icon displayed on the home screen, extends in a first direction to a predetermined point on the home screen, extends in a second direction from the predetermined point, and then extends to an ending point, wherein the predetermined point is positioned at a location on the home screen not occupied by an icon or object displayed on the home screen, and in response to the second touch-and-drag input, the controller is configured to:
compare a starting point of the second touch-and-drag input, the ending point of the second touch-and-drag input, and the moving path of the second touch-and-drag input having a prescribed shape to the starting point, the ending point, and the moving path of the stored unlocking pattern having the prescribed shape;

display, on the home screen, a notification indicating a result of the comparison when the starting point, the ending point, and the moving path having the prescribed shape of the second touch-and-drag input does not correspond to the set unlocking pattern; and display the home screen in an unlocked mode when the starting point, the ending point, and the moving path having the prescribed shape of the second touch-and-drag input corresponds to the starting point, the ending point, and the moving path having the prescribed shape of the stored unlocking pattern.

8. The terminal of claim 7, wherein the moving path of the unlocking pattern extends from the first icon associated with the starting point on the lock screen, along the prescribed shape of the moving path to the second icon associated with the ending point.

9. The terminal of claim 7, wherein, when the appearance of the home screen is changed, the appearance of the home screen in the locked mode is changed corresponding to the change to the home screen such that the home screen in the locked mode and the unlocked mode remain the same.

10. The method of claim 1, wherein the first icon is assigned to the starting point of the unlocking pattern such that when the first icon is moved to a new position on the home screen, resetting the unlocking pattern or displaying a notification indicating a change in the position of the starting point.

11. The terminal of claim 7, wherein when the first icon or the second icon are moved to a new position on the home screen, the unlocking pattern is reset or a notification indicating a change in the position of the starting point is displayed.

12. The method of claim 1, wherein the moving path having the prescribed shape of the second touch-and-drag input includes a change in direction at the predetermined point on the home screen.

13. The terminal of claim 7, wherein the moving path having the prescribed shape of the second touch-and-drag input includes a change in direction at the predetermined point on the home screen.

* * * * *